(12) United States Patent
Shiraki

(10) Patent No.: US 9,190,818 B2
(45) Date of Patent: Nov. 17, 2015

(54) ELECTRICAL CONNECTION BOX

(71) Applicant: SUMITOMO WIRING SYSTEMS, LTD., Yokkaichi, Mie (JP)

(72) Inventor: Takashi Shiraki, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/506,114

(22) Filed: Oct. 3, 2014

(65) Prior Publication Data

US 2015/0101839 A1 Apr. 16, 2015

(30) Foreign Application Priority Data

Oct. 11, 2013 (JP) ................................. 2013-214084

(51) Int. Cl.
*H02G 3/08* (2006.01)

(52) U.S. Cl.
CPC ............... *H02G 3/088* (2013.01); *H02G 3/081* (2013.01)

(58) Field of Classification Search
CPC ......... H02G 3/08; H02G 3/081; H02G 3/088; H02G 3/16; H02G 3/086; H05K 5/00; H05K 5/02; H05K 5/04; B60R 16/00; B60R 16/0239; B60R 16/02; H01H 9/02; H01H 9/04

USPC ................ 174/50, 520, 59, 535, 559, 560; 439/76.1, 76.2, 949, 535; 361/600, 361/601, 679.01, 730, 752, 760, 761; 220/3.2, 3.3, 4.02

See application file for complete search history.

(56) References Cited

U.S. PATENT DOCUMENTS

| | | | |
|---|---|---|---|
| 7,253,356 B2 * | 8/2007 | Kiyota et al. | 174/50 |
| 7,671,275 B2 * | 3/2010 | Kubota | 174/50 |
| 7,883,342 B2 * | 2/2011 | Yoshida et al. | 439/76.2 |
| 7,978,459 B2 * | 7/2011 | Nakanishi et al. | 439/76.1 |
| 8,210,378 B2 * | 7/2012 | Takeuchi et al. | 220/4.02 |
| 8,338,704 B2 * | 12/2012 | Mizukami | 174/50 |
| 8,420,931 B2 * | 4/2013 | Soh et al. | 174/50 |
| 8,878,059 B2 * | 11/2014 | Makino | 174/50 |
| 8,941,009 B2 * | 1/2015 | Makino et al. | 174/50 |

* cited by examiner

*Primary Examiner* — Angel R Estrada
(74) *Attorney, Agent, or Firm* — Oliff PLC

(57) ABSTRACT

An electrical connection box has a first case, a second case, a drain hole, an upward-protruding outer wall, and a downward-protruding inner wall. The second case is assembled beneath the first case. The drain hole is formed in an overlap surface of the second case overlapping the first case, the drain hole vertically penetrating the second case. The upward-protruding outer wall is formed at an outer side of the drain hole of the overlap surface, the upward-protruding outer wall being disposed at an outer side of the first case and protruding upward. The downward-protruding inner wall is formed on the first case, the downward-protruding inner wall being disposed at an inner side of the second case and protruding further downward than the overlap surface.

11 Claims, 5 Drawing Sheets

ELECTRICAL CONNECTION BOX

BACKGROUND

This application claims priority to JP 2013-214084 filed in Japan on Oct. 11, 2013, the entire disclosure of which is hereby incorporated by reference in its entirety.

The present invention relates to an electrical connection box that mounts to a vehicle or the like, and in particular relates to an electrical connection box formed by a second case assembled beneath a first case.

Conventionally, in a vehicle or the like, an electrical connection box such as a junction box or a relay box is used. For example, as disclosed in Japanese Patent Application Publication No. 2006-345616, an electrical connection box is formed by a lower cover as a second case assembled beneath a box main body as a first case.

There are electrical connection boxes positioned at locations, such as an engine compartment, where water can penetrate during rain or during a carwash. With the conventional electrical connection box, as also disclosed by Japanese Patent Application Publication No. 2006-345616, the waterproofing properties are ensured by placing an outer wall of the box main body positioned above on an outer side of an outer wall of a lower cover positioned below, such that the box main body covers the lower cover.

However, with the structure as disclosed in Japanese Patent Application Publication No. 2006-345616, during for example a car wash, when water is applied at high pressure, water enters through the space between the outer wall of the box main body and the outer wall of the lower cover, and the waterproofing properties are insufficient. In particular, there is the problem that the space between the outer wall of the box main body and the outer wall of the lower cover, which becomes the path of ingress for water, extends vertically and opens vertically inside of the box body such that water entering the space sprays upward inside the box main body, easily hitting electrical components inside the box body.

Thus, Japanese Patent Application Publication No. 2013-34320 discloses providing the box main body with an inner wall (reference numeral 33) extending downward at the inner side of the lower cover, and by having the path of ingress for water open downward inside the box body, water which has penetrated into the box main body is evacuated downward. However, the structure disclosed by Japanese Patent Application Publication No. 2013-34320 still cannot be said to be a sufficient preventative measure because water is not actually prevented from penetrating through the space between the box main body and the lower cover, and when a large amount of water has penetrated it is likely that the water will spray inside the box main body due to vibrations while driving.

SUMMARY

The present invention was made in view of circumstances such as those discussed above and has as an object providing an electrical connection box with a new structure having improved waterproofing properties.

A first illustrative embodiment is an electrical connection box having a first case, a second case, a drain hole, an upward-protruding outer wall, and a downward-protruding inner wall. The second case is assembled beneath a first case. The drain hole is formed in an overlap surface of the second case, the overlap surface overlapping the first case, the drain hole vertically penetrating the second case. The upward-protruding outer wall is formed at an outer side of the drain hole of the overlap surface, the upward protruding outer wall being disposed at an outer side of the first case and protruding upward. The downward-protruding inner wall is formed on the first case, the downward-protruding inner wall being disposed at an inner side of the second case and protruding further downward than the overlap surface.

With the electrical connection box formed according to the first illustrative embodiment, a drain hole penetrating the second case may be formed at the overlap surface of the downward-positioned second case that overlaps the first case. Accordingly, it is possible to evacuate through the drain hole to outside of the box body the majority of water penetrating between the overlapping surfaces of the first case and the second case, and the ingress to the inside of the box body can be prevented.

Also, a downward-protruding inner wall may be formed on the box main body and may be disposed on an inner side of the second case, extending further downward than the overlap surface. Accordingly, a space between a peripheral wall of the second case and the downward-protruding inner wall, which forms the path of ingress for water, opens downward inside the box body, and thus, even if water penetrates from the space between the first case and the second case, it can be evacuated downward inside the box body. Accordingly, it is less likely that water will hit the electrical components inside the box body.

In addition, an upward-protruding outer wall may be provided at the overlap surface of the second case and may be disposed at an outer side of the first case protruding upward. Accordingly, water which hits the box body can be made to impact the outer surface of the first case disposed at the inner side of the upward-protruding outer wall, and can be guided to the drain hole disposed below. Accordingly, it is possible to more effectively prevent the ingress of water. In other words, if the upward-protruding outer wall were not provided, almost all of the water could directly penetrate at the overlapping surfaces of the first case and the second case, and if water pressure were high, the water would likely penetrate to the inside of the box body without entering the drain holes. However, according to the present embodiment, the upward-protruding outer wall is formed, and water attempting to penetrate to the inside of the box body can be first made to impact the outer surface of the first case disposed at the inner side of the upward protruding outer wall, thereby abating the momentum of the water, and then guided to the drain holes.

In this manner, according to the present embodiment, with the upward-protruding outer wall and the drain holes, it is possible to effectively prevent the ingress of water to the inside of the box body and to significantly reduce the water which penetrates to the inside of the box body. Also, even if a small amount of water does penetrate to the inside of the box body, due to the water being evacuated downward inside the box body by the downward-protruding inner wall, the spray inside the box body can be suppressed, and the soaking of electrical components inside the box body can be suppressed.

A second illustrative embodiment is such that the drain hole of the first illustrative embodiment may comprise a plurality of drain holes extending around, for example, an entire periphery of the second case.

According to this illustrative embodiment, by forming the drain holes around the entire periphery of the second case, it is possible to achieve waterproofing of the entire periphery of the electrical connection box. Furthermore, with this illustrative embodiment, the drain holes being formed around the entire periphery of the second case can signify that they are formed continuously, as much as possible, around the entire periphery of the second case. This also can signify that the drain holes are formed around the entire periphery except for those locations where they cannot be formed, for example, where beams for supporting and connecting the upward-protruding outer wall with the outer surface of the second case, or where a removal opening for removing an electrical wire inside the box main body to the outside is formed on the second case.

A third illustrative embodiment is such that, with the structure of the first or second illustrative embodiment, a concave part may be formed recessed inwardly on the first case at a location disposed outward of the upward-protruding outer wall, the upward-protruding outer wall being positioned inside the concave part such that an outer surface of the upward-protruding outer wall and an outer surface of the first case are disposed in a same plane.

According to this illustrative embodiment, the outer surface of the upward-protruding outer wall provided to the second case and the outer surface of the first case may be disposed in the same plane. Accordingly, it is possible to minimize the irregularity of the outer surface of the electrical connection box, avoid electrical wires and such catching on the outer surface, and improve the aesthetic appearance of the electrical connection box. In addition, an inner wall of the concave part may be positioned above the upward-protruding outer wall and may function as a cover such that entrance of water from above can be suppressed and the waterproofing properties can be improved.

According to a preferred embodiment, it is possible to prevent the ingress of water by evacuating water to outside the box body via the drain hole(s) formed in the overlap surface of the second case that overlaps the first case. In particular, by providing the upward-protruding outer wall which protrudes upward from the outer side of the drain hole(s) and which covers the outer side of the first case, it is possible to guide water toward the drain hole(s) through the space between the upward-protruding outer wall and the outer surface of the first case, thereby more effectively preventing the ingress of water inside the box body. Also, even if water penetrates inside the box body, due to the provision of the downward-protruding inner wall disposed at the inner side of the second case and extending downward, it is possible to evacuate downward the water that has penetrated to the inside of the box body and prevent water from spraying inside the box body. As a result, it is possible to ensure improved waterproofing properties and to prevent water leakage on the electrical components inside the box body.

DETAILED DESCRIPTION OF EMBODIMENTS

Embodiments of the present invention will be explained below with reference to the drawings.

Figure 1:
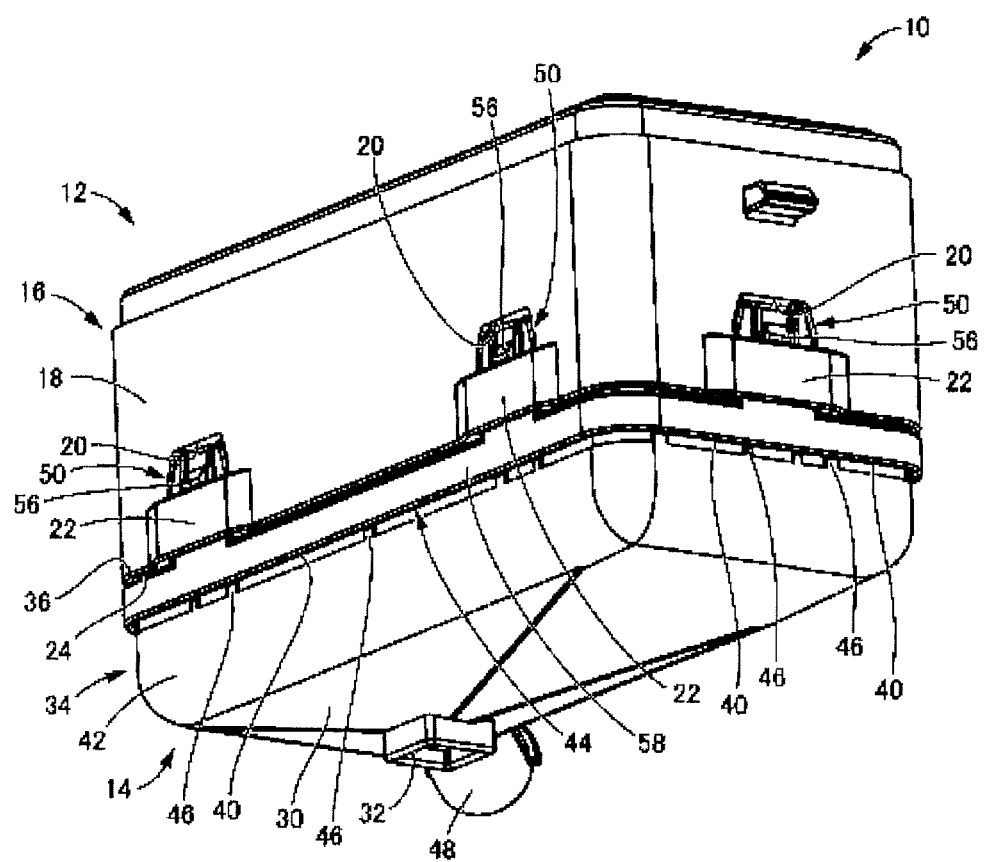
FIG. 1 is a perspective view of an electrical connection box as one embodiment of the present invention.
Figure 2:
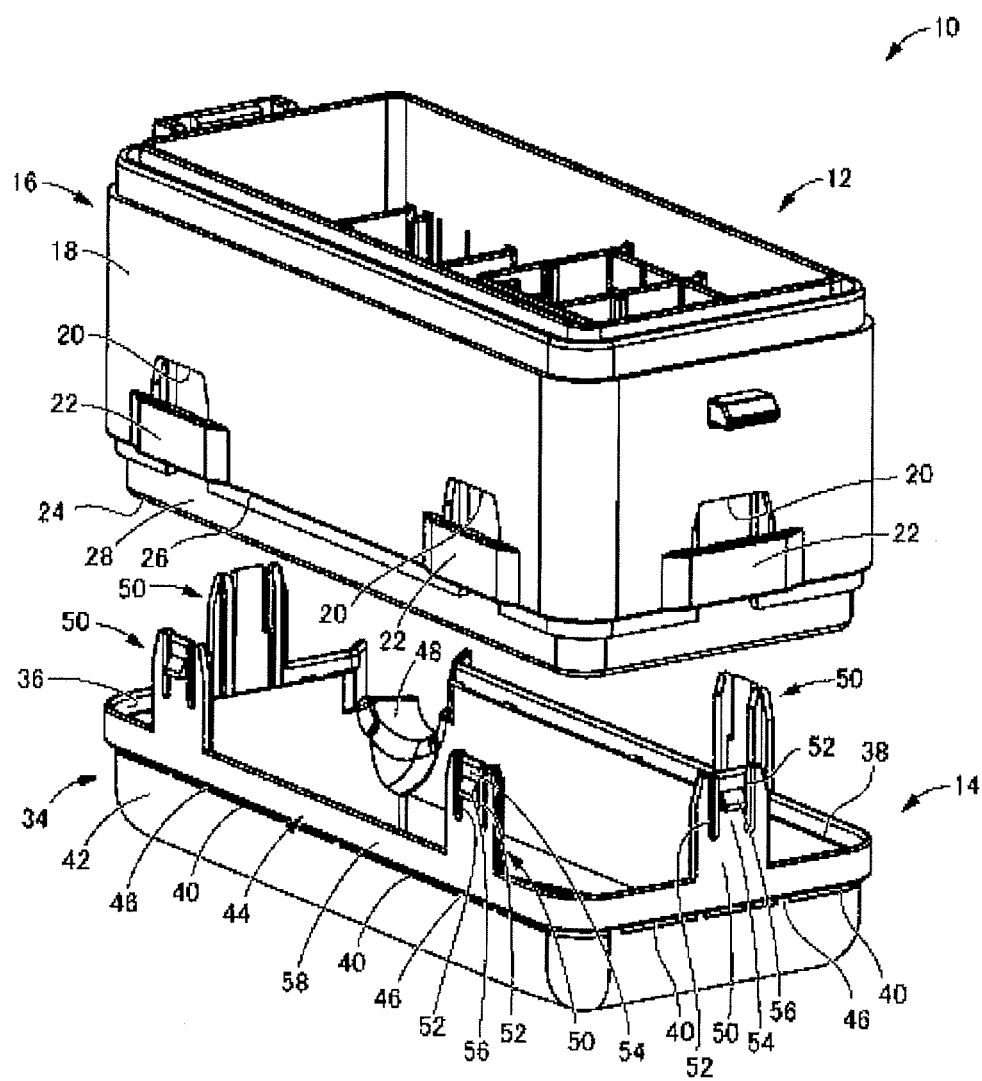
FIG. 2 is an exploded perspective view of the electrical connection box shown in FIG. 1.
Figure 3:
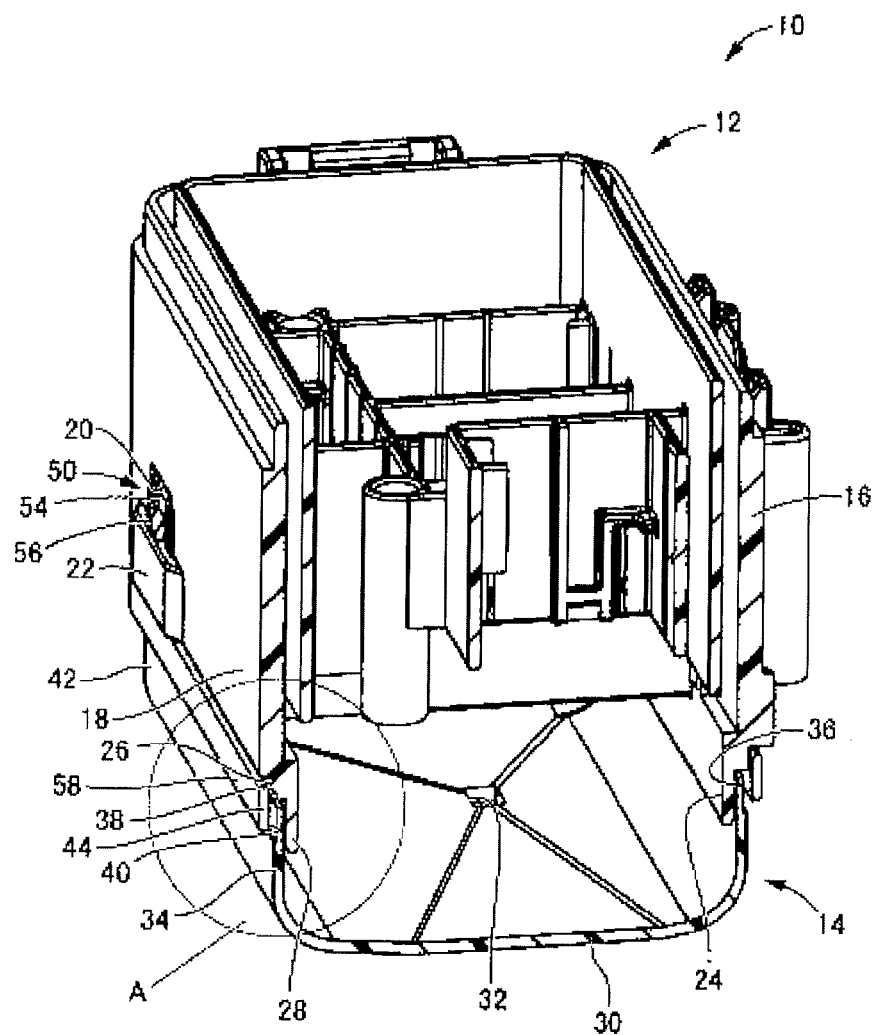
FIG. 3 is a longitudinal section perspective view of the electrical connection box shown in FIG. 1.

First, FIGS. 1-3 show an electrical connection box 10 as one embodiment of the present invention. The electrical connection box 10 may be formed by assembling a lower cover 14 as a second case beneath a main body case 12 as a first case.

The main body case 12 may be formed, for example, in a substantially longitudinal rectangle box body shape which is open, for example, both above and below. Also, the upper side opening part of the main body case 12 may be covered by an upper cover assembled thereon. At multiple locations on a peripheral wall 16 of the main body case 12 are formed lock storage parts 20 which open to an outer surface 18 of the peripheral wall 16. Each lock storage part 20 may be formed as a recess extending vertically relative to the peripheral wall 16, and an end part at a lower side thereof may open downward relative to the peripheral wall 16. In addition, a lower end portion of each lock storage part 20 may be bridged and covered by a latch plate part 22 at the side of the outer surface 18.

Figure 4:
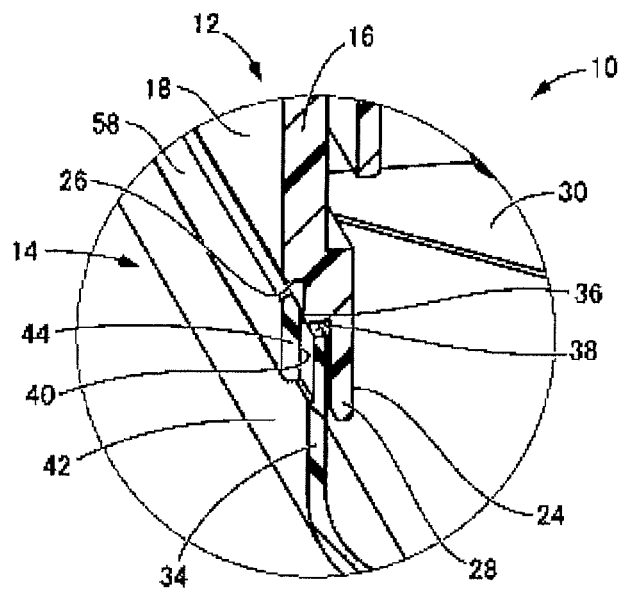
FIG. 4 is an enlarged view of portion A in FIG. 3.
Figure 5:
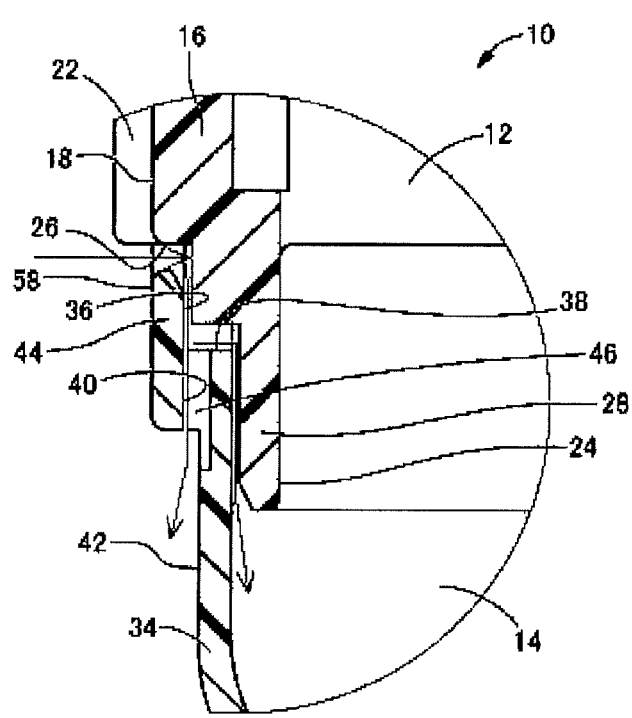
FIG. 5 is a cross-sectional view showing portion A in FIG. 3 together with the flow of water.

As seen enlarged in FIGS. 4 and 5, at the peripheral wall 16 of the main body case 12, an end part at the side of a lower side aperture part 24 may be formed in an uneven configuration, and a concave part 26 recessed to the inner side of the main body case 12 may be formed around an entire periphery. Also, a downward-protruding inner wall 28 may be formed at an inner side of the concave part 26 and may protrude further downward than the concave part 26.

Figure 6:
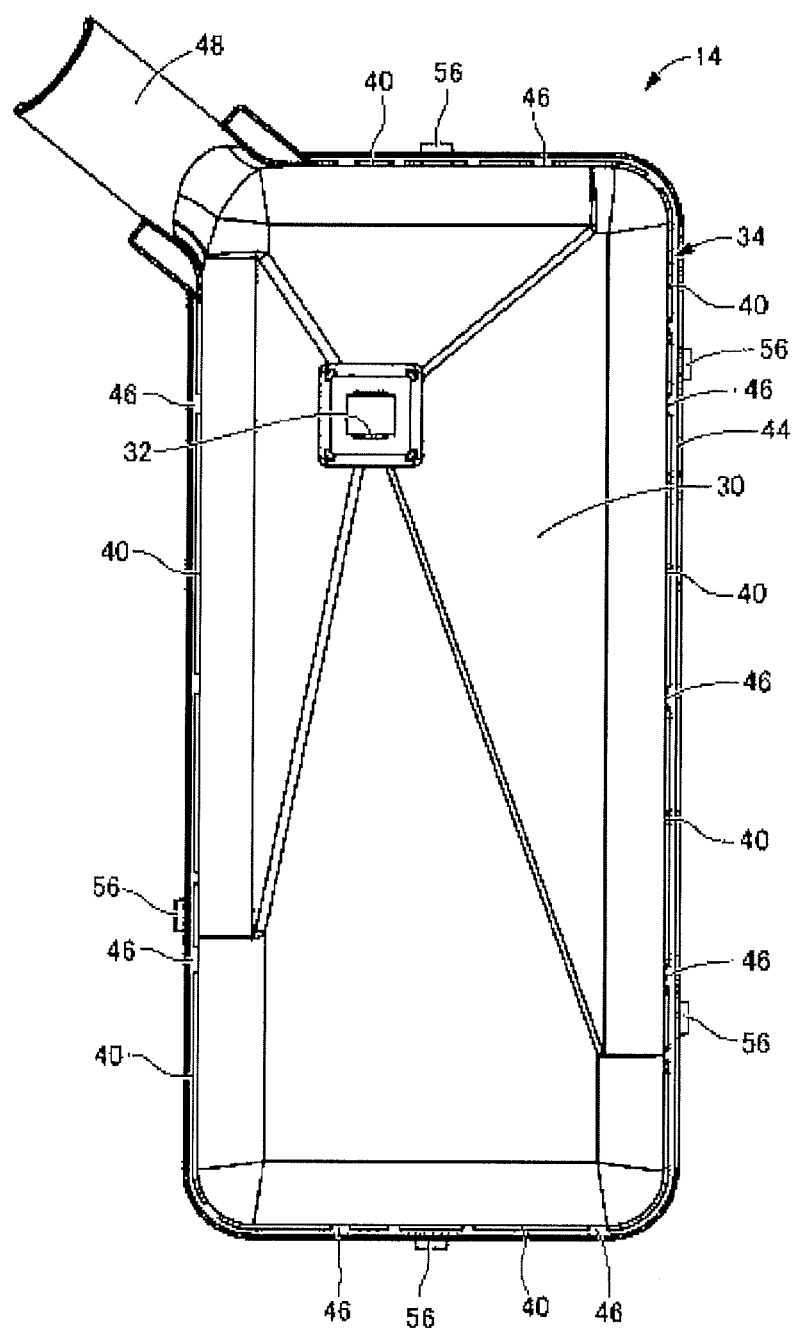
FIG. 6 is a bottom view of the lower cover.

As also shown in FIG. 6, the lower cover 14 may be formed, for example, in a box body shape opening upward. A bottom wall 30 of the lower cover 14 may be formed protruding so as to narrow toward one lower part, with a water removal hole 32 formed at a lowermost location of the bottom wall 30.

As shown in FIGS. 4 and 5, a peripheral wall 34 of the lower cover 14 may have an end surface on the side of an upper side aperture part 36 which is an overlap surface 38 with the main body case 12. Formed at the overlap surface 38 are drain holes 40 which vertically penetrate the lower cover 14. By forming the drain holes 40 at the side of an outer surface 42 of the peripheral wall 34, the holes 40 open downward at the outer side of the lower cover 14, and water can be drained to outside of the lower cover 14. In addition, at the overlap surface 38, the upward-protruding outer wall 44 may be formed protruding further upward at the outer side of the drain holes 40. Accordingly, the lower cover 14 may be formed to expand to the outer side at the upper side aperture part 36.

Moreover, as shown in FIG. 6, the drain holes 40 may be formed substantially around the entire periphery of the lower cover 14. Specifically, in order to support the upward-protruding outer wall 44 disposed on the outer side of the overlap surface 38, beam parts 46 may be formed at a plurality of locations connected to the outer surface 42 of the peripheral wall 34 and protruding to the outer side. The drain holes 40 may be formed as much as possible around the entire periphery except for the portions where the overlap surface 38 is interrupted by the locations where the beam parts 46 are formed and the corner part of the lower cover 14 where the electrical wire removal opening 48 is formed.

In addition, as is clear from FIG. 2, lock pieces 50 may be formed at a plurality of locations on the upward protruding outer wall 44. The lock pieces 50 may be formed as protrusions which protrude further upward than the upward protruding outer wall 44. On the lock pieces 50, a pair of parallel notched slits 52 and 52 is formed extending downward from a front end edge of the upward-protruding outer wall 44. Elastically deformable engagement pieces 54 are formed between these slits 52 and 52. Latch stops 56 are formed on outer sides of the engagement pieces 54.

This form of lower cover 14 may be assembled from below the main body case 12. As shown in FIG. 2, each lock piece 50 of the lower cover 14 is aligned with a lock storage part 20 of the main body case 12 and is inserted between the lock storage part 20 and the latch plate part 22. Accordingly, as shown in FIG. 1, the lock pieces 50 are held in the lock storage parts 20, and the latch stops 56 formed on the engagement pieces 54 of the lock pieces 50 ride over the latch plate parts 22 and are latched above the latch plate parts 22. In this manner, the lower cover 14 is assembled beneath the main body case 12.

As shown in FIGS. 3-5, with the main body case 12 and the lower cover 14 in an assembled state, the main body case 12 lays over the overlap surface 38 of the lower cover 14. Accordingly, the upward-protruding outer wall 44 of the lower cover 14 is disposed at the outer side of the main body case 12, and the downward-protruding inner wall 28 of the main body case 12 is disposed at the inner side of the lower cover 14. With this arrangement, the lower side aperture part 24 of the main body case 12 and the upper side aperture part 36 of the lower cover 14 are mated to each other.

Particularly with this embodiment, the upward-protruding outer wall 44 of the lower cover 14 is positioned inside the concave part 26 of the main body case 12. Accordingly, the outer surface 18 of the peripheral wall 16 of the main body case 12 and the outer surface 58 of the upward-protruding outer wall 44 may be disposed in the same plane. As a result, it is possible to minimize the irregularity at the mating portion of the main body case 12 with the lower cover 14, reduce the likelihood of electrical wires and such catching, and improve the aesthetic appearance. In addition, the downward-protruding inner wall 28 of the main body case 12 is inserted inside the peripheral wall 34 of the lower cover 14 and protrudes further downward than the overlap surface 38.

With the electrical connection box 10 formed in this manner, when water penetrates between the concave part 26 of the main body case 12 and the upward-protruding outer wall 44 of the lower cover 14 as shown in FIG. 5 with an arrow, the water can be made to impact the wall surface of the concave part 26 and is guided to the drain holes 40 below. Then the water may pass through the drain holes 40 and be evacuated to outside of the electrical connection box 10. Accordingly, it is possible to reduce the ingress of water to the inside of the electrical connection box 10. In addition, in such a circumstance as high water pressure, when water penetrates to the inner side of the lower cover 14 without entering the drain holes 40, the downward-protruding inner wall 28 is positioned at the inner side of the lower cover 14 and therefore the water impacts the downward-protruding inner wall 28 and is evacuated downward. The water passes through the water removal hole 32 provided at a bottom end of the lower cover 14 and is evacuated to outside of the electrical connection box 10.

Particularly with this embodiment, the upward-protruding outer wall 44 may be formed protruding upward and disposed on the outer side of the main body case 12, at the outer side of the drain holes 40. Accordingly, water which penetrates between the main body case 12 and the lower cover 14 from above the upward-protruding outer wall 44 is made to once impact the main body case 12 disposed on the inner side, loses pressure, and then falls downward. As a result, it is possible to guide the water to the drain holes 40 disposed downward and to further reduce the ingress of water to the inside of the electrical connection box 10. Furthermore, due to the drain holes 40 being formed around substantially the entire periphery of the lower cover 14, it is possible to improve the waterproofing properties and effectively prevent the ingress of water inside the electrical connection box 10. Also, even if the water reaches the inside of the lower cover 14 without entering the drain holes 40, due to the downward-protruding inner wall 28 being positioned at the inner side of the lower cover 14, the water can be evacuated downward, spray inside the electrical connection box 10 can be suppressed, and the likelihood of the water hitting the electrical components and electrical wires and such provided in the main body case 12 can be reduced.

Although embodiments of the present invention were described above, the present invention is not limited to that specific disclosure. For example, the first case and the second case assembled beneath it are not limited to the main body case and the lower cover, but the present invention could be applied such that the first case is an upper case assembled above a main body case, and the second case is the main body case assembled below the upper case.

What is claimed is:

1. An electrical connection box comprising:
   a first case;
   a second case assembled beneath the first case;
   a drain hole formed in an overlap surface of the second case, the overlap surface overlapping the first case, the drain hole vertically penetrating the second case;
   an upward-protruding outer wall formed at an outer side of the drain hole of the overlap surface, the upward-protruding outer wall being disposed at an outer side of the first case and protruding upward; and
   a downward-protruding inner wall formed on the first case, the downward-protruding inner wall being disposed at an inner side of the second case and protruding further downward than the overlap surface.

2. The electrical connection box recited in claim 1, wherein the drain hole extends around an entire periphery of the second case.

3. The electrical connection box recited in claim 1, further comprising
   a concave part recessed inwardly on the first case at a portion disposed outward of the upward-protruding outer wall, the upward-protruding outer wall being positioned inside the concave part such that an outer surface of the upward-protruding outer wall and an outer surface of the first case are disposed in a same plane.

4. The electrical connection box recited in claim 1, wherein the upward-protruding outer wall is spaced relative to a portion of the second case disposed inward of the upward-protruding outer wall with respect to a widthwise direction of the second case.

5. The electrical connection box recited in claim 1, wherein the upward-protruding outer wall has a first end and a second end spaced relative to each other with respect to a direction of assembly of the second case to the first case, the second end forming an upper side aperture part of the second case, and
   the drain hole is formed in the second case at a location between the first end of the upward-protruding outer wall and a portion of the second case disposed inward of the upward-protruding outer wall with respect to a widthwise direction of the second case.

6. The electrical connection box recited in claim 1, wherein the downward-protruding inner wall protrudes further downward than the drain hole.

7. The electrical connection box recited in claim 1, further comprising
   a beam part formed on the second case adjacent the drain hole, the beam part being disposed between the upward-protruding outer wall and the downward-protruding inner wall with respect to a widthwise direction of the second case.

8. The electrical connection box recited in claim 7, wherein the beam part comprises a plurality of beam parts aligned with each other relative to a direction of assembly of the second case to the first case.

9. The electrical connection box recited in claim 1, wherein the drain hole comprises a plurality of drain holes aligned with each other relative to a direction of assembly of the second case to the first case.

10. The electrical connection box recited in claim 1, wherein
the upward-protruding outer wall and the downward-protruding inner wall are arranged relative to each other so as to form a path of water drainage, the path of water drainage having an inlet disposed above the upward-protruding outer wall and an outlet at the drain hole.

11. The electrical connection box recited in claim 10, wherein
the path of water drainage is located between the upward-protruding outer wall and the downward-protruding inner wall with respect to a widthwise direction of the second case.

\* \* \* \* \*